United States Patent [19]

McMaster et al.

[11] Patent Number: 4,883,527
[45] Date of Patent: Nov. 28, 1989

[54] GLASS SHEET BENDING AND TEMPERING APPARATUS

[75] Inventors: Harold A. McMaster, Woodville; Norman C. Nitschke; Dexter H. McMaster, both of Perrysburg; Ronald A. McMaster, Woodville, all of Ohio

[73] Assignee: Glasstech International L.P., Scarsdale, N.Y.

[21] Appl. No.: 249,718

[22] Filed: Sep. 27, 1988

Related U.S. Application Data

[63] Continuation of Ser. No. 83,675, Aug. 7, 1987, Pat. No. 4,822,398.

[51] Int. Cl.[4] .............................................. C03B 23/03
[52] U.S. Cl. ........................................ 65/273; 65/104; 65/106; 65/289; 65/290; 65/348; 65/351
[58] Field of Search ................. 65/104, 106, 107, 273, 65/289, 290, 348, 35

[56] References Cited

U.S. PATENT DOCUMENTS

| | | | |
|---|---|---|---|
| 4,111,676 | 7/1978 | Mechling et al. | 65/104 X |
| 4,376,643 | 3/1983 | Kahle | 65/273 X |
| 4,483,703 | 11/1984 | Kellar et al. | 65/106 X |

Primary Examiner—Arthur Kellogg
Attorney, Agent, or Firm—Brooks & Kushman

[57] ABSTRACT

A glass bending and tempering apparatus (10) is disclosed as including a first platen (14) for receiving a heated glass sheet (12) to be bent. The first platen (14) is deformable and includes an actuator (16) for deforming platen (14) from a planar shape to a bent shape. A second platen (22) is mounted above lower platen (14) for bending and quenching glass sheet (12) therebetween the platens. A template (24) is located on the other side of the second platen (22) away from glass sheet (12). Second platen (22) is pressed against template (24) as first platen (14) is deformed from the planar shape to the bent shape to bend the heated glass sheet thereagainst second platen (22), the second platen (22) conforming to template (24). Quenching gas is supplied by both platens (14,22) through quench openings (18) that move with the platens (14,22) to temper the bent glass sheet between the platens.

16 Claims, 6 Drawing Sheets

GLASS SHEET BENDING AND TEMPERING APPARATUS

CROSS REFERENCE TO RELATED APPLICATION

This application is a continuation application of U.S. patent application No. 083,675, filed Aug. 7, 1987, now U.S. Pat. No. 4,822,398, in the name of Harold A. McMaster and entitled Architectural Glass Bending System.

TECHNICAL FIELD

This invention relates to an apparatus for bending and quenching glass sheets.

BACKGROUND ART

Glass sheets are bent and quenched to provide a desired shape for a particular application and to improve the mechanical characteristics of the bent glass sheet, respectively. Typically, the glass sheet to be bent is heated to its deformation point of about 1200°–1300° F. and then bent to the required shape before being rapidly cooled by an air spray to temper the glass. Tempering greatly increases the mechanical strength of the glass and its resistance to breakage as well as causing the glass to break into small relatively dull pieces when broken instead of into large sharp slivers as in the case with untempered glass. Glass sheets have been known to be sag bent on horizontal molds having a curved bending surface on which a glass sheet is placed on the bending surface and heated to a bending temperature where the sheet sag bends under its own weight to conform to the shape of the bending surface. Heat softened glass sheets have also been known to be press bent between male and female members of a press bending mold. In addition, glass sheets have been known to be bent on vacuum molds.

Conventional glass sheet bending operations typically involve a two-step bending and quenching operation where bending and tempering take place at different stations. In some conventional press bending operations, press face distortion occurs to the bent glass sheet. Once the heat softened glass sheet is bent at the bending station, it must be transported to a quenching station where the bent glass sheet is exposed to an air spray to temper the glass sheet. As the glass is being transported, roll marking has been known to occur as well as premature cooling prior to the quenching step resulting in a partial tempering or breakage of the bent glass sheet. Also, once the glass sheet arrives at the quenching station, the quenching air typically is applied in a non-uniform manner with respect to the bend in the bent glass sheet causing unbalanced rates of cooling over the surface of the glass sheet. Furthermore, the exit temperature of the glass sheet in a twostep operation must be higher to allow for the increased transportation time of the heated glass sheet.

Prior art references noted by a search conducted prior to filing this application are discussed below. U.S. Pat. No. 4,277,276 to John D. Keller et al provides a vacuum mold capable of defining a flat configuration or a selected curve configuration that is capable of engaging a heat softened flat glass sheet by applying vacuum while engaged with the glass sheet in the flat configuration and bending the glass by deforming the mold to the selected curved configuration. The curved glass sheet is quenched at a quench station separate from the bending station where the vacuum mold is located.

U.S. Pat. No. 4,236,909 to Dean L. Thomas et al provides an apparatus for heat strengthening glass sheets which includes a cooling station and a set of nozzles on each side of a path of glass travel to thereby force cool the glass sheets at a more rapid rate than its normal rate of cooling. No bending is provided for by this apparatus.

U.S. Pat. No. 4,203,751 to Mario Roth et al provides a process utilizing vertical male and female mold members having center and jointed elements. The molds are brought together to confine a heat softened sheet of glass between the center elements and the jointd elements are simultaneously moved to bend the portion of the sheet engaged between the jointed elements with respect to the center portion of the sheets. No quenching apparatus is provided.

U.S. Pat. No. 2,223,124 to William Owen provides a method and apparatus for bending and case hardening glass sheets on a horizontal runway having rolls which are movable to sag so that the peripheries of the rolls engaging the lower surface of the glass sheet describe the curvature to which it is desired to bend the sheet. The bent glass sheet is quenched by air blasts emanating from stationary nozzles that do not conform to the shape of the bent glass sheet resulting in non-uniform cooling of the bent glass sheet. Also, no topside bending surface is used requiring higher glass sheet temperatures to bend the glass sheet.

DISCLOSURE OF INVENTION

An object of the present invention is to provide an apparatus for bending and tempering glass sheets at one station and to reduce roll marking and press face distortion as well as lowering the glass temperature necessary for the combined bending and quenching operation.

Another object of the invention is to provide an apparatus that has movable quench openings that move with the surfaces of the flat glass sheet to provide equal thermal conditions during tempering and a more uniformly tempered glass sheet.

A further object of the invention is to provide an apparatus that is operable for repeatedly bending glass sheets to a given bent glass sheet shape.

A further object of the invention is to provide means for quickly changing the shape to be bent by replacing inexpensive templates.

In carrying out the above objects and other objects of the invention, the glass bending and tempering apparatus constructed in accordance with the invention comprises a first platen for receiving a heated glass sheet to be bent. The first platen is deformable and includes an actuator for deforming the first platen from a planar shape to a bent shape. The first platen includes quench openings throughout. The quench openings of the first platen are movable with the platen during the deformation of the platen. A second platen has quench openings throughout and opposes the first platen with the glass sheet between the platens. The actuator is constrainable and has the ability to lift portions of the first platen a controlled distance to form the desired bent shape in the glass sheet. Preferably, the actuator is programmable and can thereby be programmed to lift portions of the first platen to bend the glass sheet.

In the preferred construction, a template is mounted on the other side of the second platen away from the glass sheet. The second platen is pressed against the template as the first platen is deformed from a planar shape to a bent shape. The template thereby gives shape to the heated glass sheet as the glass sheet is bent against the second platen as the second platen conforms to the template shape. After the bending, quenching gas is supplied to the quench openings of both platens and thereby to both sides of the glass sheet to temper the bent glass sheet between the platens.

In the preferred embodiment of the invention, the bending and tempering apparatus includes a support that mounts the opposed bending platens at upper and lower locations with respect to each other, the template being mounted above the upper platen. The lower platen is deformable and has a connection to the actuator so as to deform the lower platen from the planar shape to the bent shape. The upper platen is initially conformingly deformable to the shape of the lower platen as the heated glass sheet is moved with the lower platen and bent between the upper and lower platens. Both platens subsequently conform to the shape of the template as the lower platen is moved toward the template and the glass sheet is bent to its final bent shape. Both of the platens include quench openings that move therewith during the deformation of the platens and subsequently supply quenching gas to temper the bent glass sheet.

The lower platen includes deformable drive shafts, drive wheels mounted on the drive shafts to engage the heated glass sheet and provide movement thereof during platen deformation that provides the bending. Quench tubes define the quench openings of the lower platen and rotatably support the drive shafts thereof such that the drive wheels move the heated glass sheet during the bending and quenching. The upper platen incldes idler shafts, idler wheels mounted on the idler shafts to engage the heated glass sheet and to rotate with movement of the glass sheet. Similarly, quench tubes define the quench openings of the upper platen and rotatably support the idler shafts.

The upper platen further includes an actuator for raising the upper platen to allow the glass sheet to be indexed therebetween the platens. The actuator allows the upper platen to be maintained in its deformed shape against the template after the bending of the glass sheet and furthermore allows for controllably returning the upper platen to a planar shape.

The apparatus further includes a source of quenching gas and a connector for connecting the source of quenching gas to the quench tubes. A means reversibly drive the drive wheels to move the glass sheet during the bending and quenching. In the most preferred embodiment of the invention, the means comprises a control and reversible drive electric motors operated by the control.

Spacer wheels are mounted to the platens and separte the upper and lower platens from contact so that the heated glass sheet can be introduced between the platens. An adjuster is provided for adjusting the spacer wheels to provide variable separation between the platens so that different thicknesses of glass sheets can be bent and quenched.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
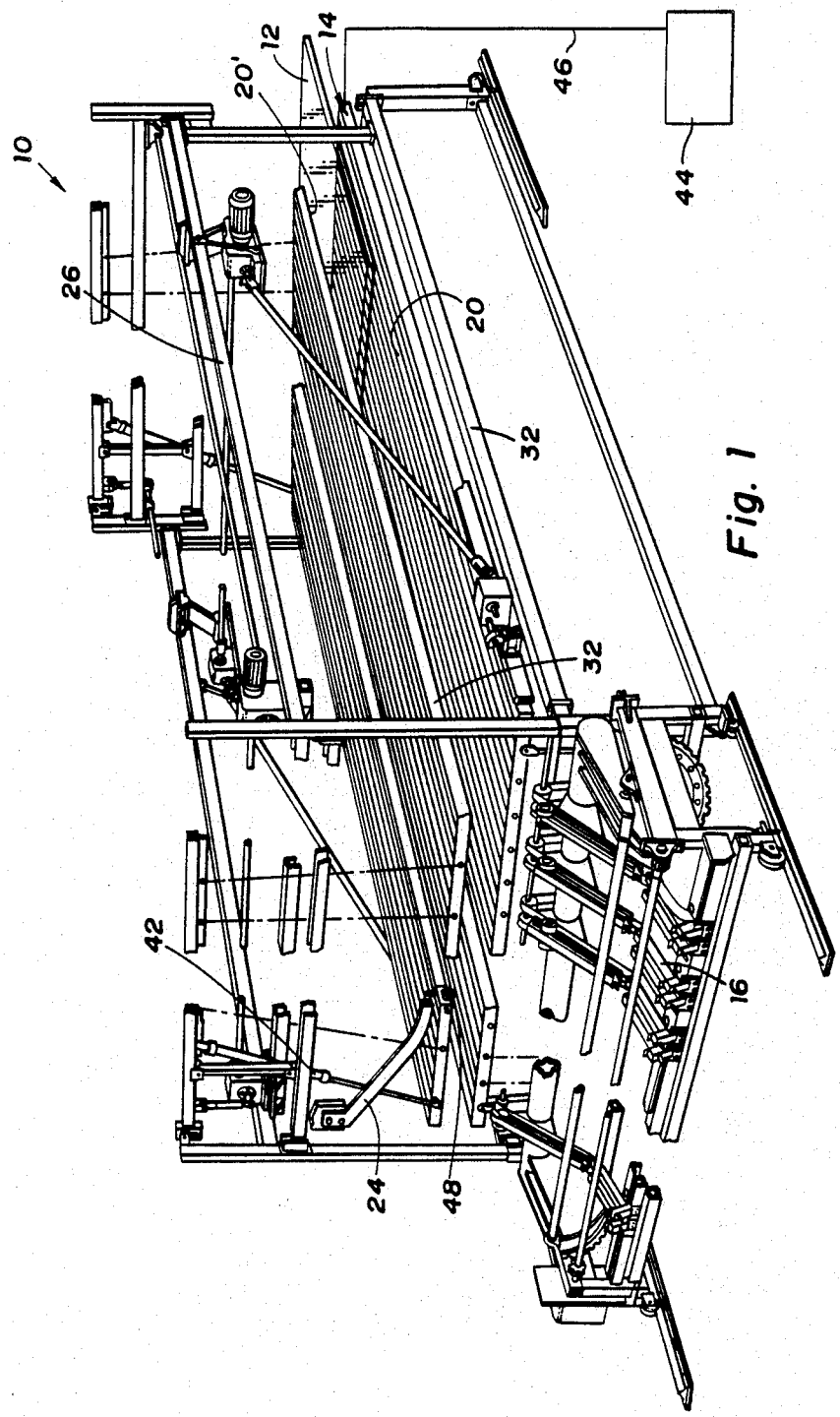
FIG. 1 is a perspective view of a glass bending and tempering apparatus constructed in accordance with the present invention and illustrated with a pair of opposed bending platens in a planar configuration.

Referring to FIG. 1 of the drawings, a glass bending and tempering apparatus constructed in accordance with the present invention is generally indicated by reference numeral 10 and used to bend and quench a heated glass sheet 12 at one station. As is hereinafter more fully described, the bending and tempering apparatus 10 reduces roll marking and press face distortion normally associated with conventional bending and tempering systems as well as allowing for use of a lower glass temperature for the combined bending and quenching operation. Furthermore, tempering apparatus 20 is operable for repeatedly bending a glass sheet 12 to a given bent glass sheet shape with greater accuracy than conventional apparatus.

As shown in FIG. 1, the glass bending and tempering apparatus 10 comprises a first platen 14 for receiving the heated glass sheet 12 to be bent. The first platen 14 is deformable and includes an actuator 16 for deforming the platen from a planar shape to a bent shape. Actuator 16 is illustrated as a cable driven mechanical actuator 16', in FIG. 1, and also as a plurality of fluid actuable piston and cylinder arrangements 17, in FIGS. 5 through 8, although it is contemplated within the scope of the invention to utilize a single actuator. Actuator 16 is controllable to control the amount of bending or deformation of the first platen 14 across the platen 14. The first platen includes quench openings 18 throughout a surface 20 of the platen, best seen in FIG. 2. The quench openings 18 are movable with the platen 14 during deformation of the platen which performs the bending.

Figure 3:
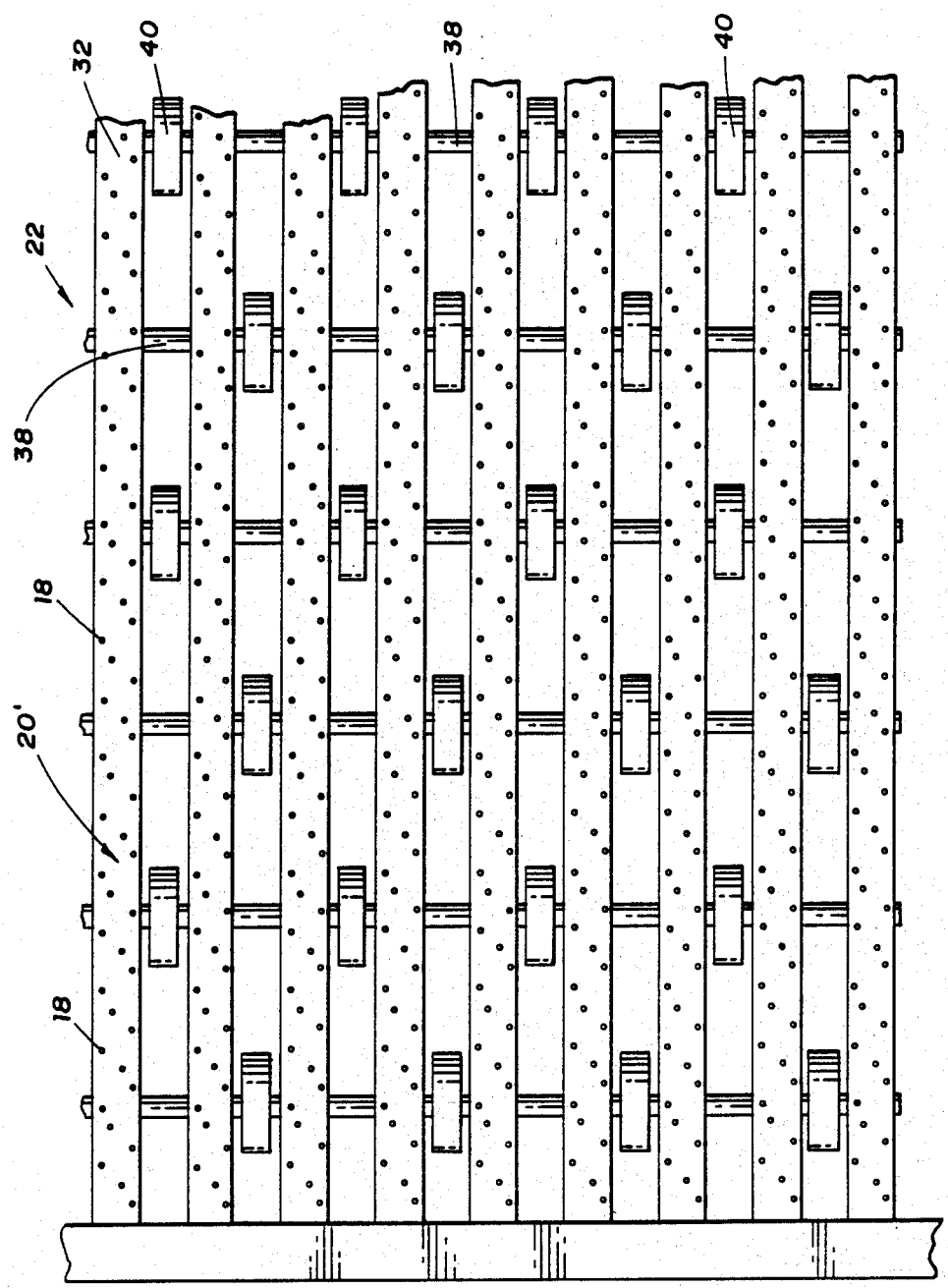
FIG. 3 is a plan view of an upper bending platen.

A second platen 22 also has quench openings 18 throughout a surface 20' of the platen, best seen in FIG. 3. The second platen 22 opposes the first platen 14 with the glass sheet 12 therebetween. The actuator is constrainable and has the ability to lift portions of the first platen a controlled distance to form the desired bent shape in the glass sheet. Preferably, the actuator 16 is programmable and can thereby be programmed to lift portions of the first platen 14 to bend the glass sheet 12.

In the preferred construction, a template 24, seen in FIGS. 5 through 8, is located on the other side of the second platen 22 away from glass sheet 12. The second platen 22 is pressed against template 24 as the first platen 14 is deformed from a planar shape to a bent shape to bend the heated glass sheet thereagainst the second platen. The second platen 22 conforms to template 24. Quenching gas is supplied to the quench openings of both platens 14,22 and thereby to both sides of glass sheet 12 to temper the bent glass sheet between the platens.

When using actuator 16 to control the bending, the piston and cylinders are programmed for preset movement whereby a predetermined portion of the first platen 14 is lifted to form a desired bend in the glass sheet 12. Thusly, actuator 16 can be programmed so that all movements of the pistons and cylinders are completed simultaneously or so that the speed of the movements is controlled to create a substantially uniform bending rate throughout the glass sheet 12.

A support 26 mounts the opposed bending platens 14,22 at upper and lower locations with respect to each other. The template 24 is mounted above the upper platen 14. The lower platen 22 is deformable and has a connection to actuator 16 so as to deform the lower platen from the planar shape to the bent shape. The upper platen 22 is initially conformingly deformable to the shape of the lower platen 14 as the heated glass sheet 12 is moved with the lower platen and bent between the platens. Both of the platens 14,22 subsequently conform to the shape of template 24 as the lower platen 14 is moved toward the template and the glass sheet is bent to its final bent shape. Both of the platens 14,22 include quench openings 18 that move with the platens during the deformation of the platens and subsequently supply quenching gas to temper the bent glass sheet.

Figure 2:
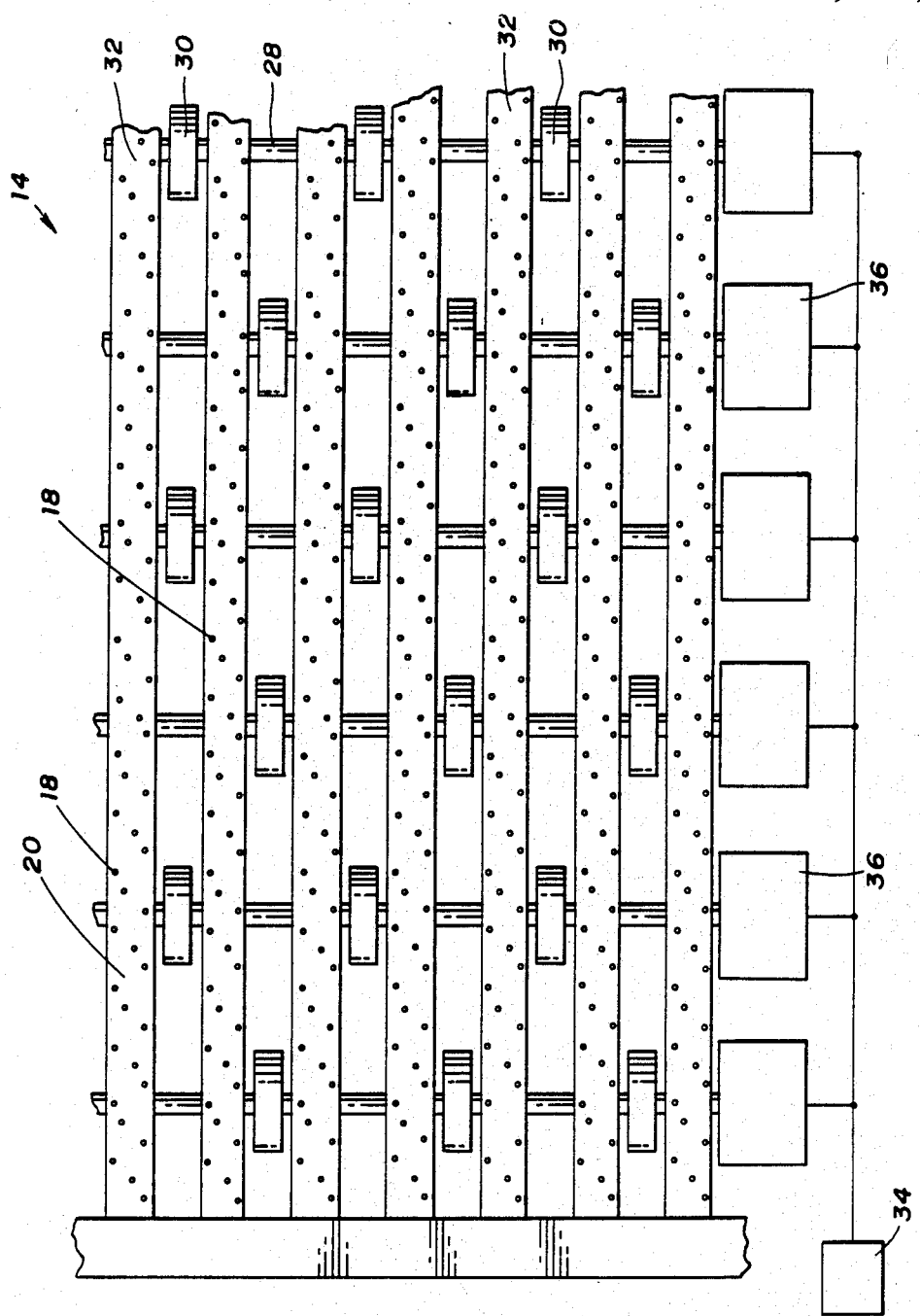
FIG. 2 is a plan view of a lower bending platen.

As shown in FIG. 2 of the drawings, the lower platen 14 includes deformable drive shafts 28 and drive wheels 30 mounted on the drive shafts to engage the heated glass sheet 12 and provide movement of the glass sheet during platen deformation that provides the bending. Quench tubes 32 define the quench openings 18 of lower platen 14 and rotatably support drive shafts 28 such that the drive wheels 30 move the heated glass sheet 12 during the bending and quenching. A control 34 and reversible drive electric motors 36 drive drive wheels 30 to index the glass sheet 12 into the glass bending and tempering apparatus, oscillate the glass sheet during the bending and tempering and index the glass sheet out of the apparatus after the bending and quenching are completed.

As shown in FIG. 3 of the drawings, the upper platen 22 includes idler shafts 38 and idler wheels 40 mounted on the idler shafts to engage the heated glass sheet 12 and to rotate with movement of the glass sheet. As with the lower platen 14, quench tubes 32 define the quench openings 18 of the upper platen 22 and rotatably support the idler shafts 38.

Figure 4:
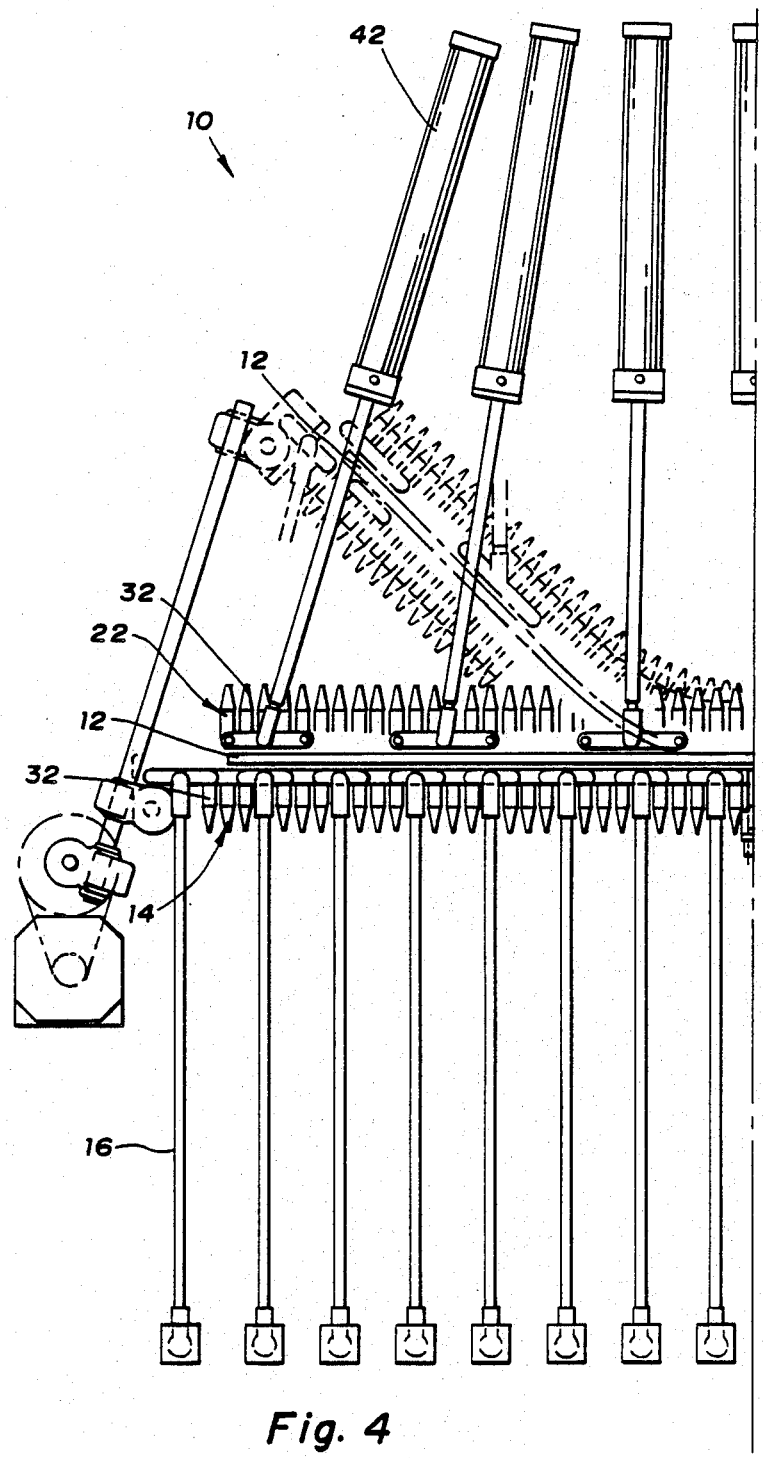
FIG. 4 is a sectional end view of the apparatus shown in FIG. 1 illustrating actuators connected to the platens and, as shown in phantom, the configuration of the platens in a bent shape.

As shown in FIG. 4 of the drawings, upper platen 22 further includes an actuator 42 also illustrated as a plurality of piston and cylinder arrangements 43 of the fluid actuable type for raising the upper platen to allow the glass sheet 12 to be indexed between the platens 14,22. Actuator 42 also allows upper platen 22 to be maintained in its deformed shape against template 24 after the bending of the glass sheet 12 and furthermore allows for controllably returning the upper platen to a planar shape after the bent glass sheet has been indexed out of apparatus 10. It is contemplated that stops on actuator 42 or a control can be provided to limit the upward movement of the upper platen 22 thereby defining a curve for the bending in lieu of template 24.

With further reference to FIG. 1 of the drawings, apparatus 10 includes a source 44 of quenching gas and a connector 46 for connecting the source of quenching gas to the quench tubes 32. Spacer wheels 48 are mounted to the platens 14,22 and separate the platens from contact so that the heated glass sheet 12 can be introduced therebetween. An adjuster 50 is provided for adjusting spacer wheels 48 to provide variable separation between platens 14,22 so that different thicknesses of glass sheets can be bent and quenched between the platens.

Figure 5:
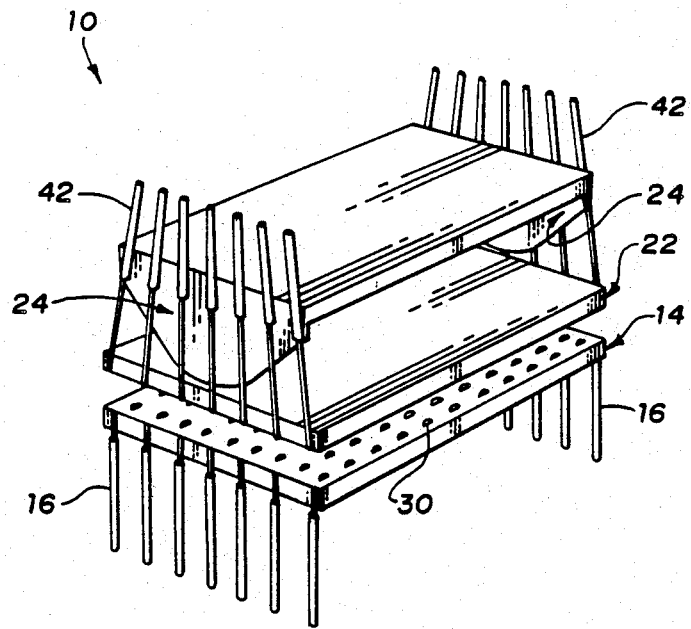
FIG. 5 is a perspective view of the apparatus illustrating the platens in a planar configuration for receiving a heated glass sheet.
Figure 6:
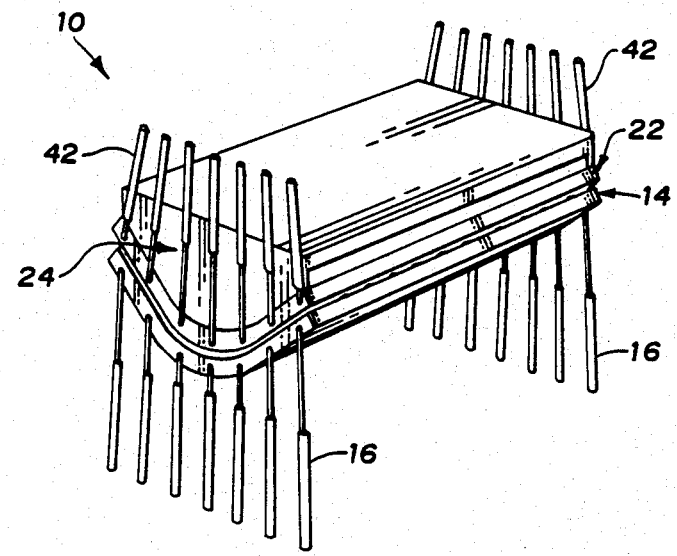
FIG. 6 is a perspective view of the apparatus illustrating the platens having been deformed from the planar shape in FIG. 3 to a bent shape to bend the heated glass sheet.

FIGS. 5 through 8 illustrate a cycle of operation of apparatus 10. In FIG. 5, platens 14,22 are in a planar spaced configuration for receiving the heated glass sheet 12 which has been heated in a glass heating furnace, not shown. Actuator 42 has been operated to maintain upper platen 22 in a spaced planar position above lower platen 14. After the heated glass sheet 12 has been indexed onto lower platen 14, by operation of drive wheels 30, beneath upper platen 22, the lower platen 14 is raised and deformed by actuator 16 to a preset profile to bend the heated glass sheet 12 while oscillating the glass sheet between the platens 14,22. Actuator 16 is continually operated to press lower platen 14 upward against upper platen 22 and thereby template 24 and bend the heated glass sheet to the shape of template 24 as shown in FIG. 6. The glass sheet 12 is then immediately quenched to provide the desired mechanical characteristics.

Figure 7:
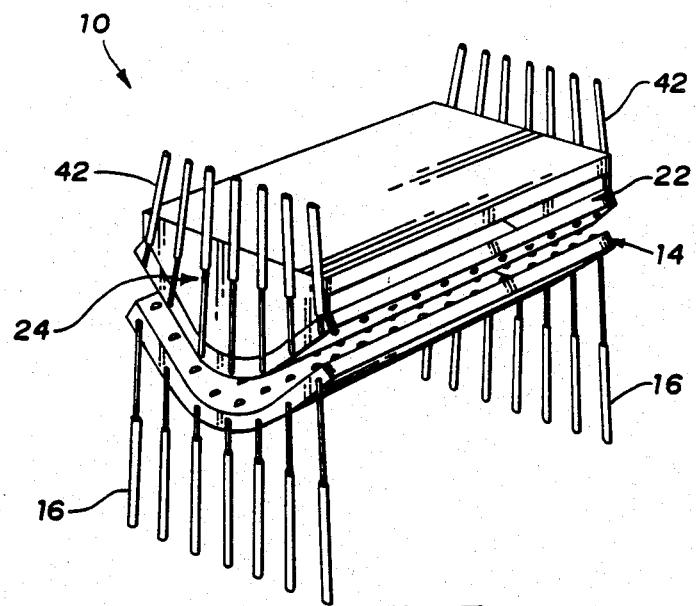
FIG. 7 is a perspective view of the apparatus illustrating separation of the platens after bending and quenching for removing the heated glass sheet.

FIG. 7 of the drawings illustrates the post bending position of the glass sheet bending and quenching cycle wherein actuator 42 maintains the upper platen 22 against template 24 while at the same time lower platen 14 is lowered by operation of actuator 16 to thereby allow the bent glass sheet 12 to be indexed out of apparatus 10.

Figure 8:
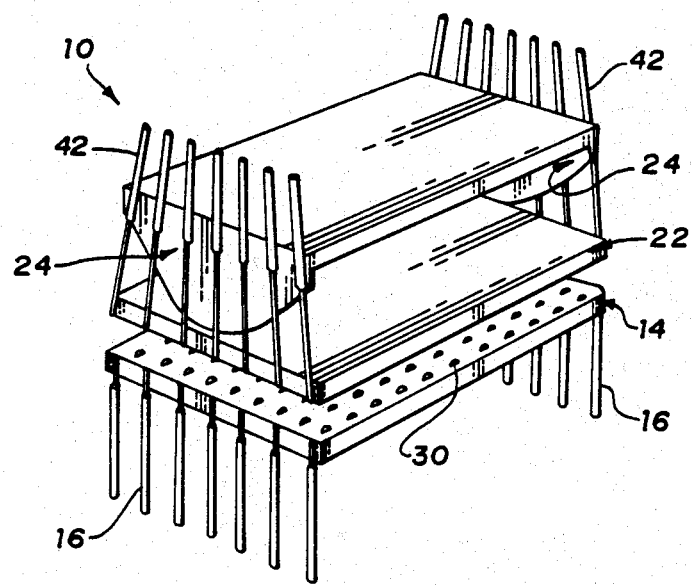
FIG. 8 is a perspective view of the apparatus illustrating the platens after being returned to the planar configuration of the platens after a bending and quenching cycle.

Subsequently, as shown in FIG. 8, lower platen 14 is returned to a planar position as also shown in FIG. 5 and actuator 42 is operated to return upper platen 22 to the planar configuration also illustrated in FIG. 5.

While the best mode for carrying out the invention has been described in detail, those familiar with the art to which this invention relates will recognize various alternative designs and embodiments for practicing the invention as defined by the following claims.

What is claimed is:

1. A glass bending and tempering apparatus comprising: a first platen for receiving a heated glass sheet to be bent; said first platen being deformable and including an actuator for deforming said platen from a planar shape to a bent shape; said first platen including quench openings throughout the extent thereof; said quench openings of the first platen movable therewith during the deformation of the platen; a second platen having quench openings throughout the extent thereof and opposing the first platen in spaced relationship with the glass sheet therebetween; said actuator being constrainable and having the ability to lift portions of said first platen a controlled distance to form the desired bent shape in the glass sheet; and quenching gas being supplied to the quench openings of both platens and thereby to both sides of the glass sheet to temper the bent glass sheet between the platens.

2. An apparatus as in claim 1 wherein said actuator includes a plurality of devices each being programmable with preset strokes to lift portions of said first platen the proper distance to form the desired bent shape in the glass sheet.

3. An apparatus as in claim 2 wherein the strokes of all actuator devices are completed simultaneously.

4. An apparatus as in claim 2 wherein the speed of the actuator is programmed to create a substantially uniform bending rate throughout the glass sheet.

5. An apparatus as in claim 2 wherein the actuator devices include a plurality of piston and cylinder arrangements.

6. An apparatus as in claim 1 further including a support that mounts the opposed bending platens at upper and lower locations with respect to each other, at least one template being mounted above said upper platen, the lower bending platen being deformable and having a connection to the actuator so as to deform the lower platen from the planar shape to the bent shape, the upper platen being initially conformingly deformable to the shape of the lower platen as the heated glass sheet is moved with the lower platen and bent therebetween said platens, both of said platens subsequently conforming to the shape of said template as said lower platen is moved toward said template and the glass sheet is bent to its final bent shape, and both of said platens including quench openings that move therewith during the deformation of the platens and subsequently supply quenching gas to temper the bent glass sheet.

7. An apparatus as in claim 1 wherein the lower platen includes deformable drive shafts, drive wheels mounted on the drive shafts to engage the heated glass sheet and provide movement thereof during platen deformation that provides the bending, and quench tubes that define the quench openings of the lower platen and rotatably support the drive shafts thereof such that the drive wheels move the heated glass sheet during the bending and quenching.

8. An apparatus as in claim 7 wherein the upper platen includes idler shafts, idler wheels mounted on the idler shafts to engage the heated glass sheet and to rotate with movement of the glass sheet, and quench tubes that define the quench openings of the upper platen and rotatably support the idler shafts.

9. An apparatus as in claim 8 wherein the upper platen further includes an actuator for raising said upper platen to allow the glass sheet to be indexed therebetween said platens, said actuator allowing said upper platen to be maintained in its deformed shape against said template after the bending of the glass sheet and furthermore for controllably returning said upper platen to a planar shape.

10. An apparatus as in claim 7 further including a source of quenching gas and a connector for connecting the source of quenching gas to the quench tubes.

11. An apparatus as in claim 7 further including means for reversibly driving the drive wheels to move the glass sheet during the bending and quenching.

12. An apparatus as in claim 11 wherein said means comprises a control and reversible drive electric motor operated by the said control.

13. An apparatus as in claim 9 further including spacer wheels mounted to said platens that separate said platens from contact so that the heated glass sheet can be introduced therebetween.

14. An apparatus as in claim 13 further including an adjuster for adjusting said spacer wheels to provide variable separation between said platen so that different thicknesses of glass sheets can be bent and quenched therebetween.

15. A glass bending and tempering apparatus comprising: a first platen for receiving a heated glass sheet to be bent; said first platen being deformable and including an actuator for deforming said platen from a planar shape to a bent shape; said first platen including quench openings throughout the extent thereof; said quench openings of the first platen movable therewith during the deformation of the platen; a second platen having quench openings throughout the extent thereof and opposing the first platen with the glass sheet therebetween; a support mounting said platens at upper and lower locations with respect to each other; said actuator being constrainable and having the ability to lift portions of said first platen a controlled distance to form the desired bent shape in the glass sheet; said lower platen including deformable drive shafts, drive wheels mounted on the drive shafts to engage the heated glass sheet and provide movement thereof during platen deformation that provides the bending, and quench tubes that define the quench openings of the lower platen and rotatably support the drive shafts thereof such that the drive wheels move the heated glass sheet during the bending and quenching; said upper platen including idler shafts, idler wheels mounted on the idler shafts to engage the heated glass sheet and to rotate with movement of the glass sheet, and quench tubes that define the quench openings of the upper platen and rotatably support the idler shafts; and quenching gas being supplied to the quench openings of both platens and thereby to both sides of the glass sheet to temper the bent glass sheet between the platens.

16. A glass bending and tempering apparatus comprising: a first platen for receiving a heated glass sheet to be bent; said first platen being deformable and including an actuator for deforming said platen from a planar shape to a bent shape; said first platen including quench openings throughout the extent thereof; said quench openings of the first platen movable therewith during the deformation of the platen; a second platen having quench openings throughout the extent thereof and opposing the first platen with the glass sheet therebetween; a support mounting said platens at upper and lower locations with respect to each other; said second platen including an actuator for raising and lowering said second platen with respect to said first platen; at least one template mounted above said upper platen; said second platen being pressed against said template as the first platen is deformed from a planar shape to a bent shape to bend the heated glass sheet thereagainst said second platen; said second platen conforming to said template; said lower platen including deformable drive shafts, drive wheels mounted on the drive shafts to engage the heated glass sheet and provide movement thereof during platen deformation that provides the bending, and quench tubes that define the quench openings of the lower platen and rotatably support the drive shafts thereof such that the drive wheels move the heated glass sheet during the bending and quenching; said upper platen including idler shafts, idler wheels mounted on the idler shafts to engage the heated glass sheet and to rotate with movement of the glass sheet, and quench tubes that define the quench openings of the upper platen and rotatably support the idler shafts; and quenching gas being supplied to the quench openings of both platens and thereby to both sides of the glass sheet to temper the bent glass sheet between the platens.

\* \* \* \* \*